April 16, 1940. A. ROSCH 2,197,651
ELASTIC FLUID TURBINE POWER PLANT
Filed Aug. 7, 1939
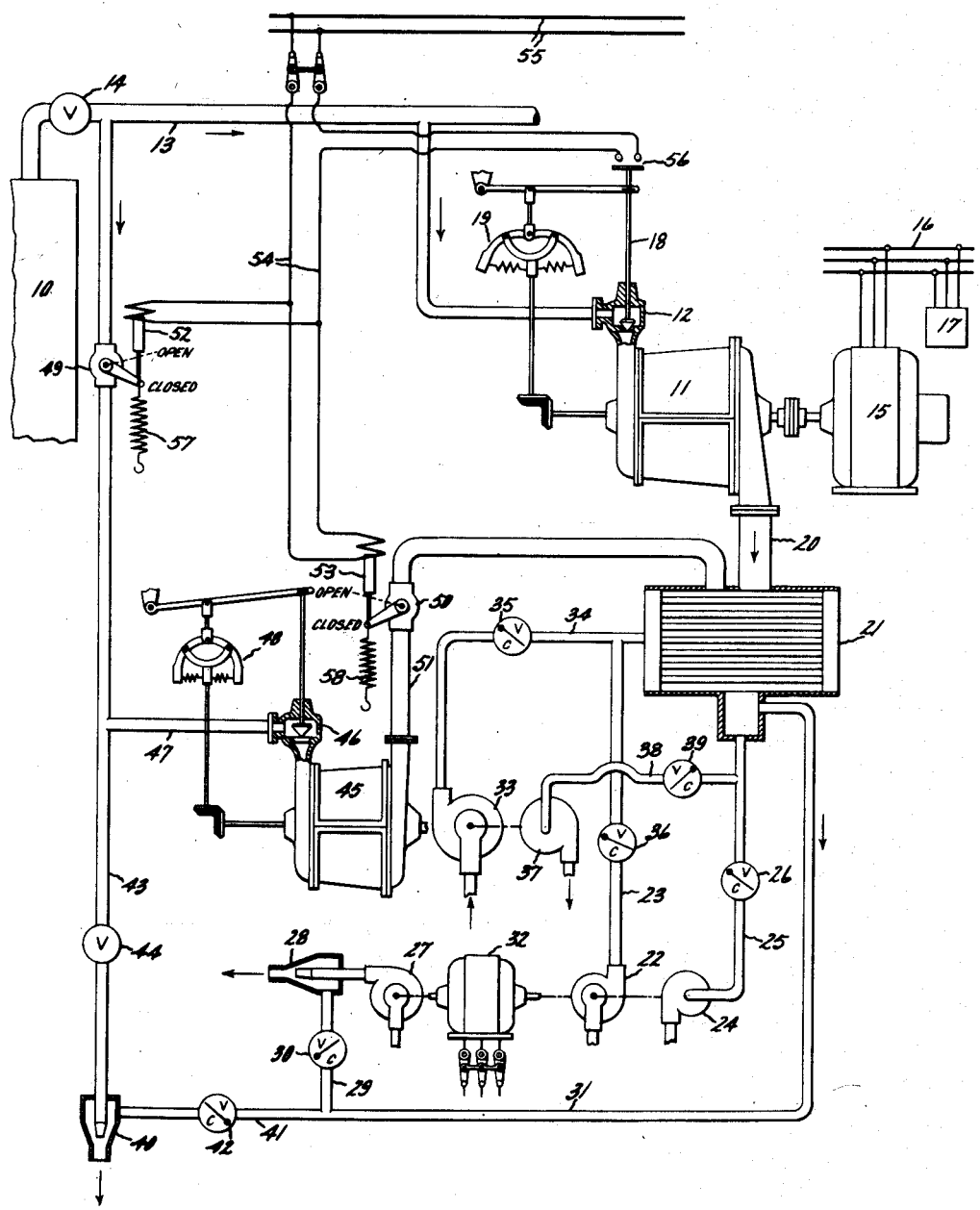
Inventor:
Arthur Rosch;
by Harry E. Dunham
His Attorney.

Patented Apr. 16, 1940

2,197,651

UNITED STATES PATENT OFFICE 2,197,651

ELASTIC FLUID TURBINE POWER PLANT

Arthur Rosch, Brieselang, near Nauen, Germany, assignor to General Electric Company, a corporation of New York Application August 7, 1939, Serial No. 288,887
In Germany November 17, 1938

3 Claims. (Cl. 290—4)

The present invention relates to elastic fluid power plants including a turbo generator with the generator operating in parallel with other generators and at times serving to furnish peak load to a line and at other times running idle to act as a synchronous condenser or phase modifier.

The object of my invention is to provide an improved arrangement of elastic fluid turbine power plants of the type above specified whereby such plants may be operated with great economy and high efficiency. This is accomplished in accordance with my invention by the provision of two groups of auxiliaries, one group for operation during high load conditions and the other group for operation during no load or low load conditions of the turbine, together with a mechanism for automatically changing operation from one group of auxiliaries to the other in response to a change of operating condition of the turbine.

For a better understanding of what I believe to be novel and my invention, attention is directed to the following description and the claims appended thereto in connection with the accompanying drawing.

The single figure of the drawing shows diagrammatically an elastic fluid turbine power plant embodying my invention.

The arrangement comprises an elastic fluid generator 10 for supplying elastic fluid to a main turbine 11 having an inlet valve 12 and connected to receive elastic fluid from the elastic fluid generator 10 through a conduit 13 including a valve 14. The turbine 11 is coupled to drive an electric generator 15 connected to a power line 16 in parallel with other generators 17. The generator 15 normally operates as a phase modifier and during high load condition on the generator 17 the generator 15 serves to supply active load to the line 16. The inlet valve 12 of the turbine 11 has a valve stem 18 connected to and moved by a speed-governing mechanism including a speed governor 19 driven from the shaft of the turbine 11 and causing opening of the valve 12 with increasing load of the turbine 11 and closing of the valve 12 with decreasing load of the turbine 11. In the present instance the valve 12 is near its closing position, permitting the supply of an amount of elastic fluid 11 to act as a cooling medium for the turbine and to furnish sufficient load for covering friction losses of the turbo generator 11, 15.

The turbine 11 has an exhaust conduit 20 connected to a surface type condenser 21. For the purpose of operating the condenser two auxiliary sets are provided, a primary set for operation during high load on the turbine 11 and a secondary set for operation during low load on the turbine 11. The secondary set includes a circulating pump 22 having a discharge conduit 23 connected to the condenser for circulating cooling medium therethrough. In addition the secondary set includes a condensate pump 24 having an inlet conduit 25 including a check valve 26 for removing condensate from the condenser and a pump 27 for operating an ejector 28 to remove air and other non-condensables from the condenser 21. The ejector 28 is connected to the condenser by means of a conduit 29 with a check valve 30 and a conduit 31. The pumps 22, 24, 27 of the secondary auxiliary set are driven by means of an electric motor 32.

The primary auxiliary set comprises a circulating pump 33 having a discharge connected by a conduit 34 including a check valve 35 in parallel with the conduit 23 to circulate cooling medium through the condenser. A similar check valve 36 is provided in the conduit 23, the latter preventing backflow of cooling medium through the conduit 23 during operation of the pump 33 and, vice-versa, the check valve 35 preventing backflow of fluid through the conduit 34 during operation of the circulating pump 22. The primary auxiliary set in addition includes a condensate pump 37 having an inlet conduit 38 including a check valve 39 connected to receive condensate from the condenser 21. Finally, the primary auxiliary set includes an ejector pump 40 for removing air and non-condensables from the condenser through a conduit 41 including a check valve 42 and connected to the conduit 31. The pump is operated by means of elastic fluid received from the conduit 13 through a conduit 43 including a valve 44. The pumps 33 and 37 of the primary auxiliary set are operated by an auxiliary turbine 45 having an inlet valve 46 for controlling the flow of elastic fluid thereto. The valve is connected to receive live elastic fluid from the conduit 43 through a conduit 47 connected to the conduit 43. The valve 46 is controlled by a speed-governing mechanism including a speed governor 48 driven from the shaft of the turbine 45. The flow of elastic fluid to the auxiliary turbine 45 for driving the primary auxiliaries and the discharge of elastic fluid therefrom is further controlled by means of a valve 49 in the conduit 43 ahead of its connection to the conduit 47 as regards the direction of flow of fluid therethrough and a valve 50 in a conduit 51 connecting the exhaust end of the turbine 45 to the condenser 21.

The valve 49 also controls the flow of operating fluid to the ejector 40. Normally, that is, during low load operation of the turbine 11 the valves 49 and 50 are in closed position as indicated. As load is taken on by the turbine 11 the valves 49 and 50 are opened. This requires great care by the operator and therefore is effected preferably automatically. To this end each valve 49, 50 has an arm operated by solenoids 52 and 53 respectively connected in parallel and energized through conductors 54 from a line 55. One of the conductors 54 includes a contact-making device or switch 56. In the present instance the device 56 is in open position, the solenoids 52, 53 being deenergized and the valves 49, 50 biased towards closing position by means of springs 57 and 58 respectively.

As stated before, with the valves 49, 50 closed, the primary auxiliary set is out of operation, no operating fluid being supplied to the auxiliary turbine 45 and to the ejector 40. If now load is thrown onto the generator 15, for instance, due to increasing load demand from the generator 17, the speed of the turbine 11 is reduced. The drop in speed causes the speed governor to effect opening movement of the valve 12 to admit more elastic fluid to the turbine 11 and this opening movement of the valve stem 18 causes closing of the contact-making device 56, thus energizing the circuit for the solenoids 52 and 53 and causing opening of the valves 49, 50 against the biasing forces of the springs 57 and 58 respectively. Elastic fluid is now supplied to the auxiliary turbine 45 to operate the primary auxiliary pumps 33 and 37 and also to the ejector 40. The motor 32 for driving the secondary auxiliary set may then be disconnected.

What I claim as new and desire to secure by Letters Patent of the United States is:

1. Elastic fluid turbine power plant including a turbine, a condenser connected to the exhaust end of the turbine, a primary and a secondary auxiliary set for operating the condenser, and means automatically connecting one set and disconnecting the other in response to a predetermined change of the load condition of the turbine.

2. Elastic fluid turbine power plant including a turbine, an electric generator driven by the turbine to act at times as a phase modifier and at other times to supply peak load, a surface type condenser connected to receive exhaust from the turbine, auxiliaries for circulating cooling medium through the condensers and for removing condensate and non-condensables from the condenser, said auxiliaries comprising a primary set for operation during peak load conditions of the generator and a secondary set for operation while the generator operates as a phase modifier, and means for automatically putting the primary set in operation as load is thrown on the turbine comprising a contact-making device moved in response to speed change of the turbine.

3. Elastic fluid turbine power plant including a main turbine with an inlet valve, an electric generator driven by the turbine to act at times as a phase modifier and at other times to supply peak load, a surface type condenser connected to receive exhaust from the turbine, auxiliaries for circulating cooling medium through the condensers and for removing condensate and non-condensables from the condenser, said auxiliaries comprising a primary set for operation during peak load conditions of the generator and a secondary set for operation while the generator operates as a phase modifier, the primary set including an elastic fluid turbine and an elastic fluid operated ejector, a conduit for supplying elastic fluid to the auxiliary turbine and the ejector, an exhaust conduit for the turbines connected to the main condenser, a valve in each of said conduits, means biasing the valves towards closing position during operation of the main turbine as phase modifier, and electric means automatically moving the valves into opening position to effect operation of the auxiliary turbine and the ejector, said electric means including an electric circuit having a contactor closed in response to a predetermined movement of the inlet valve.

ARTHUR ROSCH.